(12) United States Patent
Rydnell et al.

(10) Patent No.: US 10,542,461 B2
(45) Date of Patent: Jan. 21, 2020

(54) APPARATUSES AND METHODS THEREIN FOR RELAYING AN ONGOING DATA SESSION

(71) Applicant: Telefonaktiebolaget LM Ericsson (publ), Stockholm (SE)

(72) Inventors: Gunnar Rydnell, Göteborg (SE); Stefan Karl Toth, Göteborg (SE); Roland Gustafsson, Bengtsfors (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 15/308,319

(22) PCT Filed: Jun. 19, 2014

(86) PCT No.: PCT/EP2014/062944
§ 371 (c)(1),
(2) Date: Nov. 1, 2016

(87) PCT Pub. No.: WO2015/192904
PCT Pub. Date: Dec. 23, 2015

(65) Prior Publication Data
US 2017/0078924 A1 Mar. 16, 2017

(51) Int. Cl.
*H04W 76/25* (2018.01)
*H04W 36/00* (2009.01)

(52) U.S. Cl.
CPC ........ *H04W 36/0011* (2013.01); *H04W 76/25* (2018.02); *H04L 2212/00* (2013.01)

(58) Field of Classification Search
CPC ..... H04W 40/12; H04W 88/04; H04W 24/10; H04W 36/385; H04W 40/04; H04W 40/22; H04W 40/246; H04W 48/08; H04W 56/001; H04W 72/042; H04W 8/005; H04W 36/0011; H04W 36/0077; H04W 76/25; H04L 2212/00
See application file for complete search history.

(56) References Cited

U.S. PATENT DOCUMENTS

| 2010/0290430 A1 | 11/2010 | Lee et al. |
| 2011/0158155 A1* | 6/2011 | Park ................ H04W 40/12 370/315 |
| 2014/0112162 A1 | 4/2014 | Tavildar et al. |

(Continued)

FOREIGN PATENT DOCUMENTS

| EP | 1643715 A1 | 4/2006 |
| EP | 2733988 A2 | 5/2014 |

OTHER PUBLICATIONS

International Search Report and Written Opinion for International Patent Application No. PCT/EP2014/062944, dated Oct. 9, 2014, 6 pages.

*Primary Examiner* — Erica Navar
(74) *Attorney, Agent, or Firm* — Withrow & Terranova, PLLC

(57) ABSTRACT

Embodiments herein relate to apparatuses and methods for relaying a data session of a first wireless device via a second radio access node in a radio communications network, wherein said data session is ongoing towards the first gateway node via a first radio access node in the radio communications network.
Embodiments herein also relate to a first and a second wireless device, a ProSe function node, a MME, a gateway node and methods therein.

14 Claims, 10 Drawing Sheets

(56) References Cited

U.S. PATENT DOCUMENTS

2014/0119272 A1 5/2014 Wong et al.
2016/0156404 A1* 6/2016 Wolfner ............... H04W 76/14
  370/315
2016/0374104 A1* 12/2016 Watfa ............... H04W 36/0011

* cited by examiner

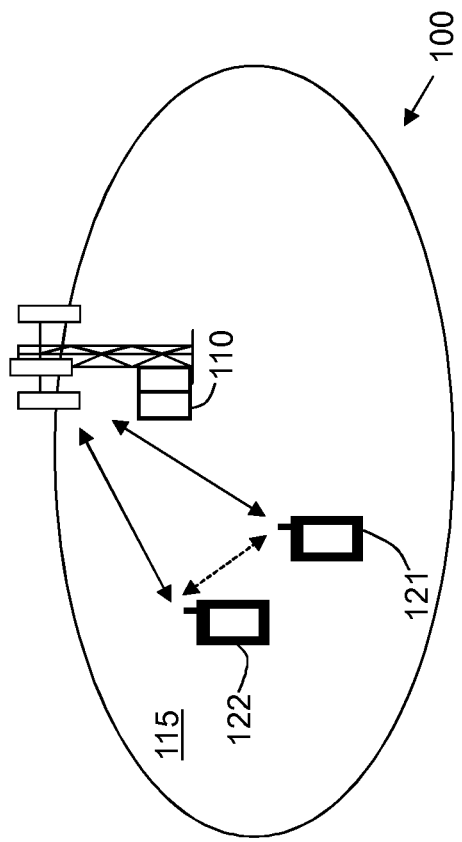
Fig. 1
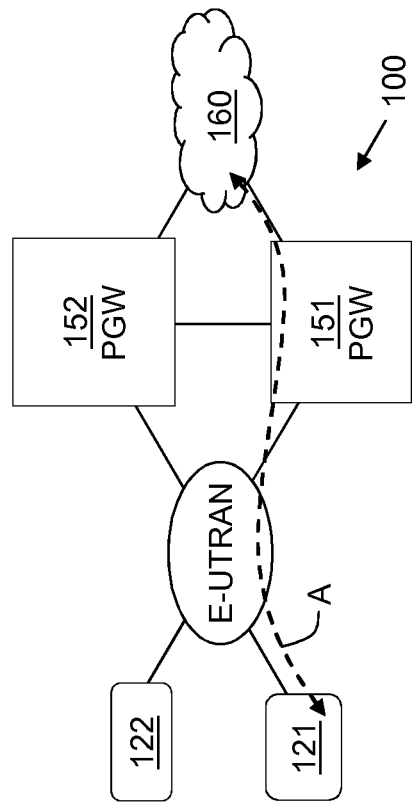
Fig. 2
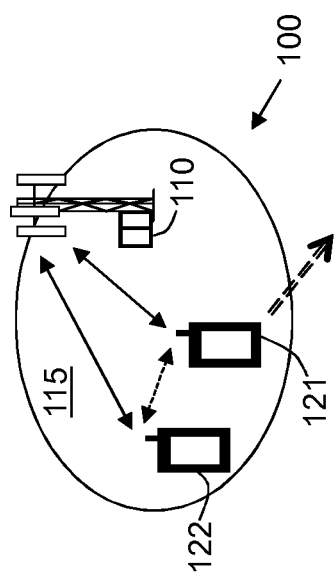

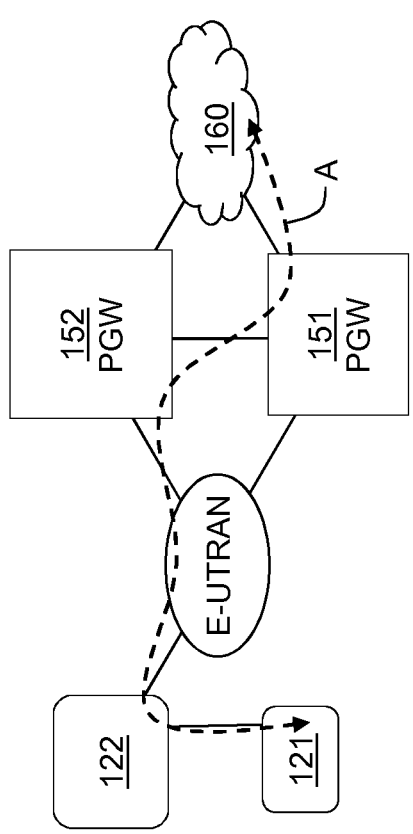
Fig. 4
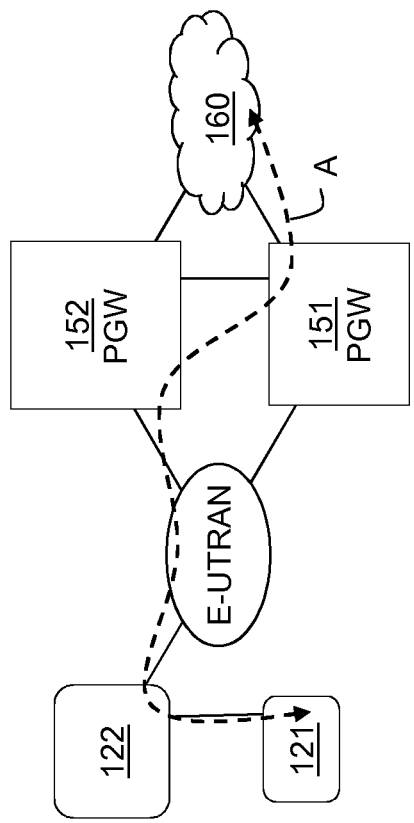
Fig. 5
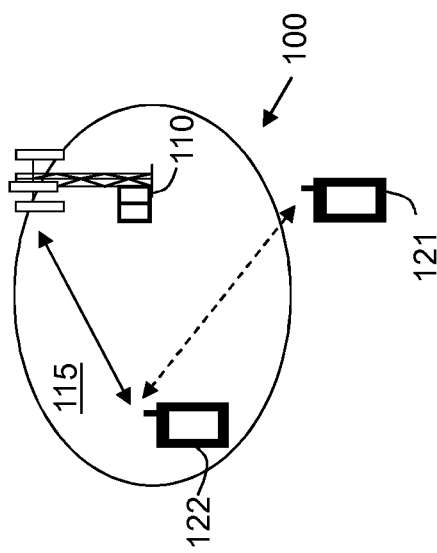
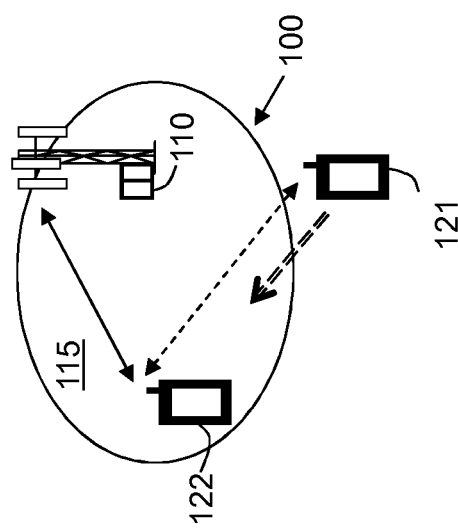

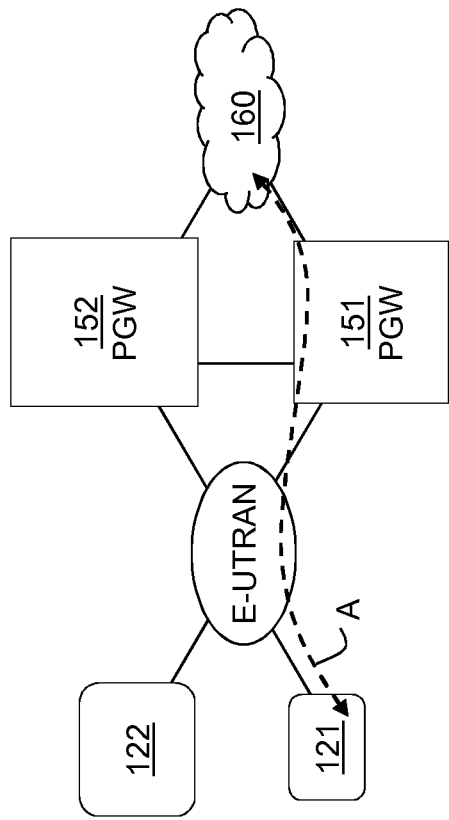
Fig. 7
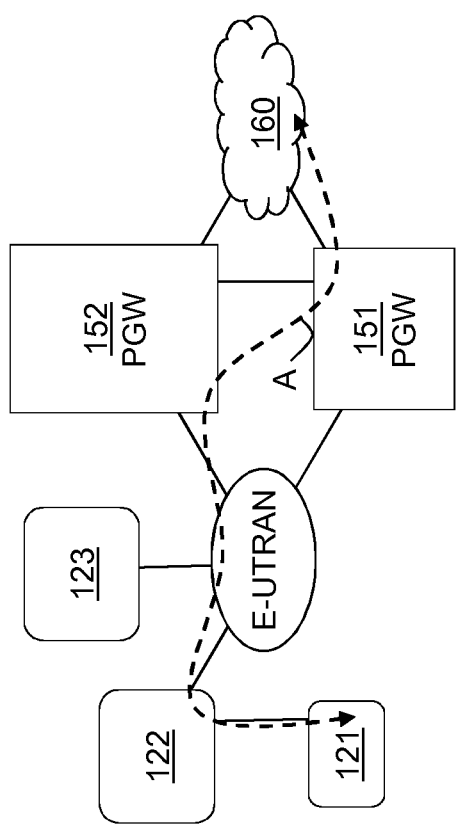
Fig. 8
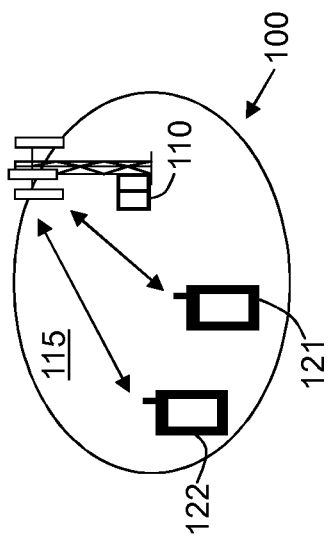
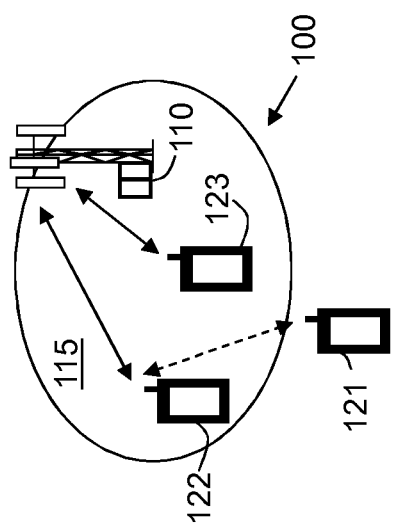

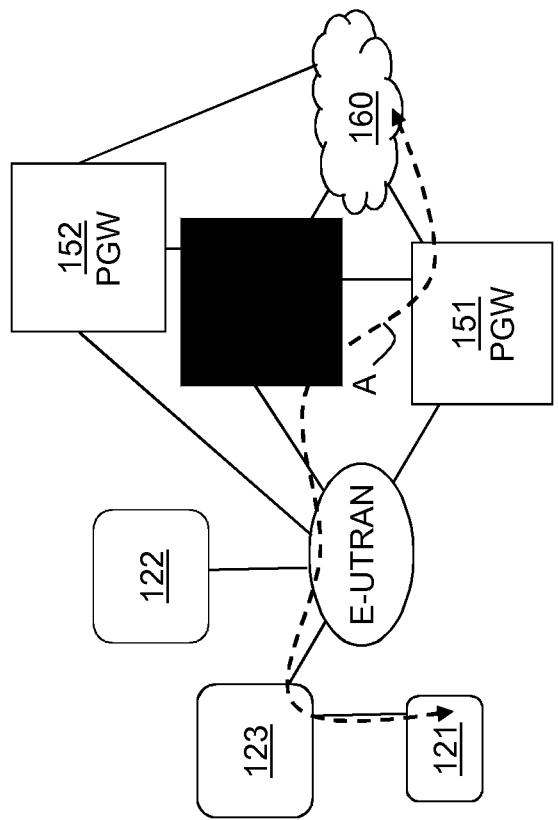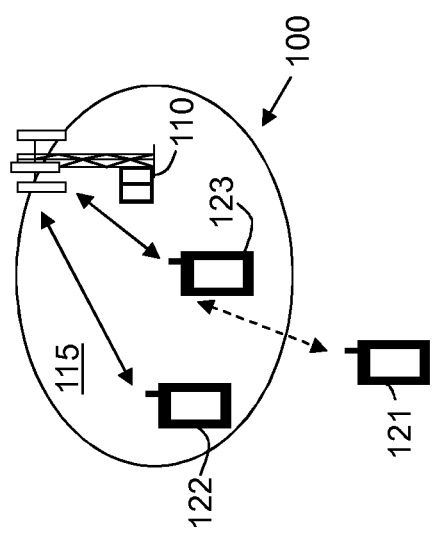
Fig. 10

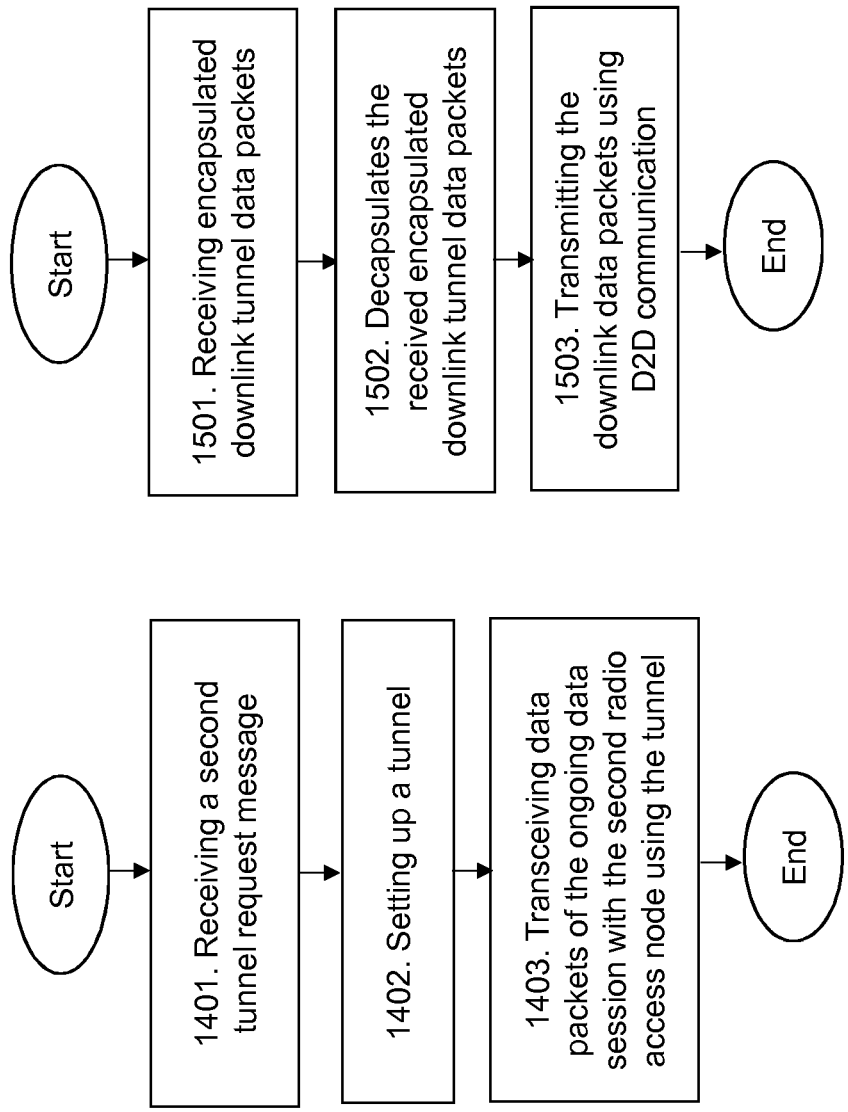

APPARATUSES AND METHODS THEREIN FOR RELAYING AN ONGOING DATA SESSION

This application is a 35 U.S.C. § 371 national phase filing of International Application No. PCT/EP2014/062944, filed Jun. 19, 2014, the disclosure of which is incorporated herein by reference in its entirety.

TECHNICAL FIELD

Embodiments herein relate to relaying of ongoing data sessions. In particular, embodiments herein relate to relaying a data session of a first wireless device via a second radio access node, wherein the data session is ongoing via a first radio access node, in a radio communications network.

BACKGROUND

In a typical radio communications network, wireless devices, also known as mobile stations, terminals and/or user equipments, UEs, communicate via a Radio Access Network, RAN, with one or more core networks. The radio access network covers a geographical area which may be divided into cell areas, with each cell area being served by a base station, e.g. a radio base station, RBS, or network node, which in some networks may also be called, for example, a "eNB", "NodeB" or "eNodeB". A cell may be a geographical area where radio coverage is provided by the radio base station at a base station site or an antenna site in case the antenna and the radio base station are not collocated. Each cell may be identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat rather than hierarchical architecture comprising radio base station nodes without reporting to RNCs.

In 3GPP LTE Release 12, a functionality called Proximity Services, ProSe, also referred to herein as a proximity service function, is specified. This functionality provides support for wireless devices to perform direct communication between each other, i.e. direct device-to-device, D2D, communication, by using a radio channel based on LTE technology. According to one example, for Public Safety, PS, users, it is allowed for two wireless devices to communicate directly between each other when there is no radio coverage from radio communications network, i.e. when there is no radio base station within reach.

Furthermore, when a first wireless device of a PS user is within radio coverage of a radio base station, e.g. eNB or eNodeB, and a second wireless device of another PS user is out of radio coverage from a radio base station, the first wireless device may act as a relay station between the out-of-coverage, second wireless device and the radio base station. In this way the out-of-coverage, second wireless device of the other PS user will be able to communicate with the radio communications network without being connected to or have access to a radio base station. This relay functionality is also specified in 3GPP LTE Release 12, wherein it describes a relay situation or scenario where a new data session is created for the second wireless device via the first wireless device. It should be emphasised that the relay functionality, where a first wireless device may act as a relay station between the out-of-coverage, second wireless device and the radio base station, is generally applicable in other situations, e.g. in situations that are similar to the exemplifying Public Safety (PS) situation mentioned above.

However, as the first and second wireless device often are mobile and may move into and out of radio coverage, there is a need to be able to maintain ongoing data sessions via the relay devices and radio base stations without having to create new data connections each time there is a change in radio coverage or relay possibilities.

SUMMARY

It is an object of embodiments herein to provide session continuity when relaying an ongoing data session.

According to a first aspect of embodiments herein, the object is achieved by a method performed by a first wireless device for relaying a data session via a second radio access node in a radio communications network. The data session is ongoing towards a first gateway node via a first radio access node in the radio communications network. The first wireless device discovers radio connectivity towards the second radio access node. The first wireless device also determines that the ongoing data session is to be relayed via the second radio access node. Then, the first wireless device transmits a relay request message, to a proximity service function, ProSe, node configured to operatively manage relaying of data sessions in the radio communications network, comprising relay information indicating that the ongoing data session is to be relayed via the second radio access node with session continuity towards the first gateway node.

Keeping session continuity towards the first gateway node serving the first wireless device at relaying via a second wireless device makes it possible for external network nodes to maintain the IP-address unchanged towards the first gateway when communicating with the first wireless device. Thus, an external network node communicating with the first wireless device does not have to change the IP-address to the address of the gateway serving the relaying second wireless device.

In addition, keeping session continuity makes it possible to keep a possible Policy and Charging Enforcement Function (PCEF) or similar executed by the first gateway with respect to the ongoing data session. Thus, a possible PCEF or similar does not have to be terminated and/or moved another gateway serving the relaying second wireless device.

According to a second aspect of embodiments herein, the object is achieved by a first wireless device for relaying a data session via a second radio access node in a radio communications network. The data session is ongoing towards a first gateway node via a first radio access node in the radio communications network. The first wireless device is configured to discover radio connectivity towards the second radio access node, determine that the ongoing data session is to be relayed via the second radio access node, and transmit a relay request message, to a ProSe function node configured to operatively manage relaying of data sessions in the radio communications network, comprising relay information indicating that the ongoing data session is to be relayed via the second radio access node with session continuity towards the first gateway node.

According to a third aspect of embodiments herein, the object is achieved by a method performed by a ProSe function node for enabling relaying of a data session of a first wireless device via a second radio access node in the radio communications network. The data session is ongoing towards a first gateway node via a first radio access node in a radio communications network. The ProSe function node is configured to operatively manage relaying of data sessions in the radio communications network. The ProSe function node receives a relay request message, from the first wireless device, comprising relay information indicating that the ongoing data session is to be relayed via the second radio access node with session continuity towards the first gateway node. Then, the ProSe function node obtains mobility information indicating a MME serving the first wireless device. Also, the ProSe function node transmits a first tunnel request message to the MME comprising the received relay information indicating that the ongoing data session is to be relayed via the second radio access node.

According to a fourth aspect of embodiments herein, the object is achieved by a ProSe function node for enabling relaying of a data session of a first wireless device via a second radio access node in the radio communications network. The data session is ongoing towards a first gateway node via a first radio access node in a radio communications network. The ProSe function node is configured to operatively manage relaying of data sessions in the radio communications network. The ProSe function node is further configured to receive relay request message, from the first wireless device, comprising relay information indicating that the ongoing data session is to be relayed via the second radio access node with session continuity towards the first gateway node, obtain mobility information indicating a MME serving the first wireless device, and transmit a first tunnel request message to the MME comprising the received relay information indicating that the ongoing data session is to be relayed via the second radio access node.

According to a fifth aspect of embodiments herein, the object is achieved by a method performed by a MME for enabling relaying of a data session of a first wireless device via a second radio access node in a radio communications network. The data session is ongoing towards a first gateway node via a first radio access node in the radio communications network and the MME serves the first radio access node. The MME receives a first tunnel request message, from a ProSe function node configured to operatively manage relaying of data sessions in the radio communications network, comprising relay information indicating that the ongoing data session is to be relayed via the second radio access node. Then, the MME obtains, using the received relay information, gateway information indicating a second gateway node serving the second radio access node. Also, the MME transmits a second tunnel request message, to the first gateway node, indicating that it is to tunnel data packets of the ongoing data session via the second gateway node.

According to a sixth aspect of embodiments herein, the object is achieved by a MME for enabling relaying of a data session of a first wireless device via a second radio access node in a radio communications network. The data session is ongoing towards a first gateway node via a first radio access node in the radio communications network and the MME serves the first radio access node. The MME is configured to receive a first tunnel request message, from a ProSe function node configured to operatively manage relaying of data sessions in the radio communications network, comprising relay information indicating that the ongoing data session is to be relayed via the second radio access node, obtain, using the received relay information, gateway information indicating a second gateway node serving the second radio access node, and transmit a second tunnel request message, to the first gateway node, indicating that it is to tunnel data packets of the ongoing data session via the second gateway node.

According to a seventh aspect of embodiments herein, the object is achieved by a method performed by a first gateway node for enabling relaying of a data session of a first wireless device via a second radio access node in a radio communications network. The data session is ongoing towards the first gateway node via a first radio access node in the radio communications network. The first gateway node receives a second tunnel request message, from a MME, indicating that it is to tunnel data packets of the ongoing with the second gateway node. Also, the first gateway node sets up a tunnel via the second gateway node for the ongoing data session. Then, the first gateway node further transceives data packets of the ongoing data session with the second radio access node using the tunnel.

According to an eight aspect of embodiments herein, the object is achieved by a first gateway node for enabling relaying of a data session of a first wireless device via a second radio access node in a radio communications network. The data session is ongoing towards the first gateway node via a first radio access node in the radio communications network. The first gateway node is further configured to receive a second tunnel request message, from a MME, indicating that it is to tunnel data packets of the ongoing data session via a second gateway node, set up a tunnel via the second gateway node for the ongoing data session, and transceive data packets of the ongoing data session with the second radio access node using the tunnel.

According to a ninth aspect of embodiments herein, the object is achieved by a method performed by a second wireless device for relaying a data session between a first wireless device and a first gateway node in a radio communications network. The second wireless device is capable of operating as a relay node for the first wireless device in the radio communications network by using Device-to-Device, D2D, communication with the first wireless device. The second wireless device receives encapsulated downlink tunnel data packets from the first gateway node via a second gateway node serving the second wireless device. Then, the second wireless device de-capsulate the received encapsulated downlink tunnel data packets to obtain downlink data packets of the ongoing data session to the first wireless device. Also, the second wireless device transmits the downlink data packets of the ongoing data session to the first wireless device.

According to a tenth aspect of embodiments herein, the object is achieved by a second wireless device for relaying a data session between a first wireless device and a first gateway node in a radio communications network. The second wireless device is capable of operating as a relay node for the first wireless device in the radio communications network by communicating with the first wireless device. The second wireless device is configured to receive encapsulated downlink tunnel data packets from the first gateway node via a second gateway node serving the second wireless device, de-capsulate the received encapsulated downlink tunnel data packets to obtain downlink data packets of the ongoing data session to the first wireless device, and transmit the downlink data packets of the ongoing data session to the first wireless device using D2D communication.

According to an eleventh aspect of embodiments herein, the object is achieved by computer programs, comprising instructions which, when executed on at least one processor, cause the at least one processor to carry out the methods described above. According to a twelfth aspect of embodiments herein, the object is achieved by a carrier containing the computer program described above, wherein the carrier is one of an electronic signal, optical signal, radio signal, or computer readable storage medium.

By having a first wireless device transmitting a relay request message for an ongoing data session, when it has determined that an ongoing data session via a first access node should be relayed via a second radio access node instead, to a ProSe function node. The ProSe function node is then able to perform signalling with the MME serving the first wireless device such that the MME may instruct the gateway node of the first wireless device to set up a tunnel towards the second radio access node or the gateway node of the second radio access node. The gateway node of the first wireless device and the second radio access node, or its gateway node, may then use the tunnel to transceive data packets of the ongoing data session on behalf of the first wireless device.

In this way, the first wireless device is able to keep its configurations, such as, e.g. IP address, determined by the first radio access node, i.e. its original gateway node with which the first wireless device first established the data session; this, while the second access node may use its existing data connection towards its gateway node to transmit and receive data packets on behalf of the first wireless device. Thus, no new data connections are required to maintain the ongoing data session when switching to relaying via the second radio access node instead of the first radio access node.

Hence, session continuity is provided when relaying ongoing data sessions.

BRIEF DESCRIPTION OF THE DRAWINGS

Embodiments will now be described in more detail in relation to the enclosed drawings.

FIG. 1 is a schematic block diagram illustrating embodiments of wireless devices in a radio communications network, FIG. 2 illustrates a first scenario for relaying an ongoing data session in a radio communications network, FIG. 4 is a schematic block diagram illustrating the result of the signalling in FIG. 3, FIG. 5 illustrates a second scenario for relaying an ongoing data session in a radio communications network, FIG. 7 is a schematic block diagram illustrating the result of the signalling in FIG. 6, FIG. 8 illustrates a third scenario for relaying an ongoing data session in a radio communications network, FIG. 10 is a schematic block diagram illustrating the result of the signalling in FIG. 9, FIG. 14 is a flowchart depicting embodiments of a method in a gateway node.

FIG. 15 is a flowchart depicting embodiments of a method in a second wireless device.

DETAILED DESCRIPTION

Figure 3:
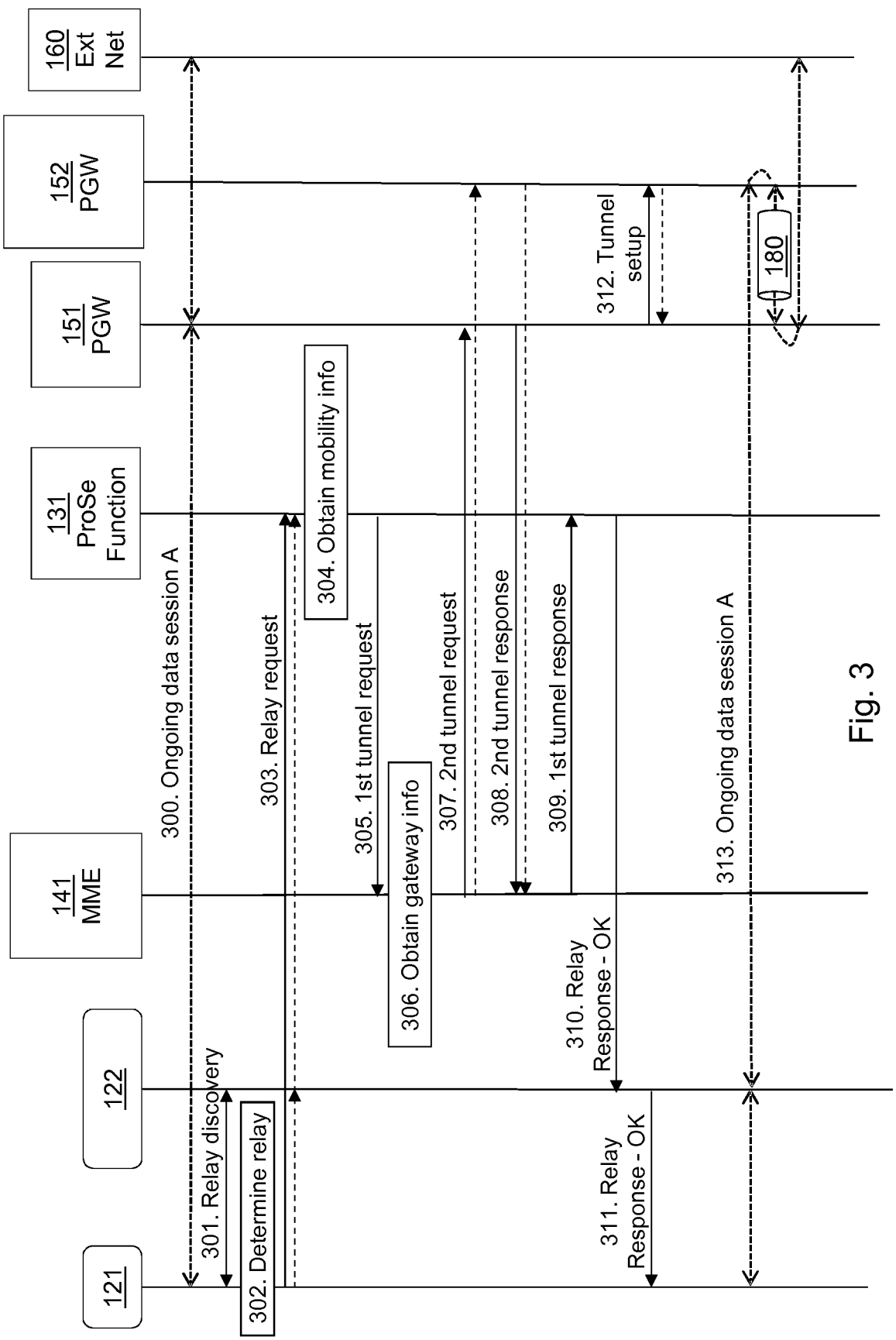
FIG. 3 is a signalling diagram for relaying an ongoing data session in the first scenario of FIG. 2 according to embodiments of a first and second wireless device, a ProSe function node, an MME and gateway nodes in a radio communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a radio communication network 100 in which embodiments herein may be implemented. Although illustrated in the example of FIG. 1 as an LTE network, the radio communications network 100 should not be considered limited to this specific wireless communications technology.

The radio communications system 100 comprises a radio access node 110. The radio access node 110 may e.g. be an eNodeB (eNB), or a Home Node B, a Home eNode B, femto Base Station (BS), pico BS or any other network unit capable to serve wireless devices in the radio communications network 100. The radio access node 110 may also be e.g. a base station controller, a network controller, a relay node, a repeater, an access point, a radio access point, a Remote Radio Unit (RRU) or a Remote Radio Head (RRH).

The radio access node 110 is configured to be connected to and form part of an Enhanced-Universal Terrestrial Radio Access Network, E-UTRAN, of the radio communications network 100.

In the example shown in FIG. 1, the radio access node 110 is configured to provide wireless radio coverage to wireless devices in a cell 115. A cell may be seen as a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell may be identified by an identity within the local radio area, which is broadcast in the cell. Another identity identifying each cell uniquely in the whole radio communication network 100 may also be broadcasted in the cell. The radio access node 110 communicates over the air or radio interface operating on radio frequencies with wireless devices within range of the radio access node 110.

Furthermore, in the example of FIG. 1, a first and second wireless device 121, 122 are located within the cell 115. The first and second wireless device 121, 122 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, a UE with D2D capability, Customer Premises Equipment (CPE), or any other radio network unit capable to communicate over a radio link in the radio communications network 100. The first and second wireless device 121, 122 may also be a Machine-to-Machine, M2M, communication device that serves as a data communication modem or is built into equipment communicating data with a server without human interaction.

The first and second wireless device 121, 122 are configured to communicate within the radio communications network 100 via the radio access node 110 over a radio link, shown by fully drawn arrows, when present in the cell 115 served by the radio access node 110.

Furthermore, it is preferred that the first and second wireless device 121, 122 are capable of communicating directly with each other using wireless D2D communication over direct D2D links, as shown by the dashed arrow. This means that the first and second wireless device 121, 122 are capable of communicating with each other using D2D communication. This may be performed over an established D2D link. This means that the first and second wireless device 121, 122 may discovery each other, establish a D2D communication, and perform D2D communication in the radio communications network 100. The radio resource in the cellular spectrum in the cell 115 used by the D2D communication may at least partly overlap with the radio resources used by the cellular communications of other wireless devices in the cell 115.

Although embodiments below are described with reference to the example of FIG. 1, this example should not be construed as limiting to the embodiments herein, but merely as an example made for illustrative purposes.

An issue which is resolved by the embodiments described below is how to provide session continuity when relaying an ongoing data session for the first wireless device 121, such that that the ongoing data session is relayed via the second wireless device 122 or any other radio access node with session continuity towards the gateway node serving the first wireless device.

This is done by having the first wireless device transmitting a relay request to a ProSe function node (e.g. ProSe function node 131 to be discussed further below with reference to FIG. 3) for the ongoing data session. The request is preferably transmitted when the first wireless device has determined that the data session ongoing via a first access node should be relayed via a second radio access node. The ProSe function node is generally configured to operatively manage relaying of data sessions in the radio communications network, e.g. manage relaying of an ongoing data session for a first wireless device via a second wireless device. The ProSe function node is configured to operatively perform signalling with a Mobility Management Entity (MME) serving the first wireless device causing the MME to instruct the gateway node of the first wireless device to set up a tunnel towards the second radio access node or the gateway node of the second radio access node. The gateway node of the first wireless device and the second radio access node can then use the tunnel to transceive data packets of the ongoing data session on behalf of the first wireless device.

FIGS. 2-4 shows schematic block diagrams and a signalling diagram which illustrates a first exemplifying scenario for relaying an ongoing data session in a radio communications network 100. In this first scenario, the first radio access node is the radio access node 110 and the second radio access node is the second wireless device 122, configured to operatively relay an ongoing data session for a first wireless device 121 as discussed above. Also, the first gateway node is here a Packet Data Network Gateway, PGW 151, of the first wireless device 121 and the second gateway node is a PGW 152 of the second wireless device 122.

Before proceeding it should be explained that a gateway node provides connectivity for the wireless terminals 121, 122 of the communications network 110 to one or more external Packet Data Networks (PDNs) e.g. the Internet or similar, and nodes or similar in the external network, e.g. such a the external network node 160 which will be discussed further below. The network gateway node may e.g. be a Gateway GPRS Support Node (GGSN) or a PGW as the PGW 151 mentioned above.

In FIG. 2, the first wireless device 121 is about to leave the radio coverage of the radio access node 110 and lose its connection with the radio communications network 100. This is illustrated to the left in FIG. 2 by the double dashed arrow. As illustrated to the right in FIG. 2, in this example the first wireless device 121 has an ongoing data session A towards PGW 151 via the radio access network, RAN or E-UTRAN, in the radio communications network 100.

With reference to FIG. 3 and partly to FIG. 2, the RAN or E-UTRAN comprises the radio access node 110 and possibly also the relaying wireless device 122, while the core network of the radio communications network 100 comprises such nodes as the ProSe function node 131, a MME 141 and the PGW 151 and/or the PGW 152s. The PGW 151 may transceive, i.e. receive and transmit, downlink, DL, and uplink, UL, data packets of the ongoing data session A between an external network node 160 and the first wireless device 121. The external network node 160 may e.g. be a Public Safety Application server or an internet server or similar. The data path of the ongoing data session A is illustrated to the right in FIG. 3 by the dashed arrow. The PGW 151 may use a Packet Data Network, PDN, connection towards the first wireless device 121. The PGW 151 may communicate with the external network node 160 over a SGi interface.

Before proceeding it should be explained that a MME (e.g. such as MME 141) serves a wireless device (e.g. such as the wireless device 121) to provide different functions, such as, Non-Access Stratum, NAS, signalling, EPS bearer management, roaming functions, etc.

Also, in addition to what has already been said above about the Proximity Service function, ProSe, node it should be clarified that the ProSe function node provides support for wireless devices to perform direct communication between each other, i.e. direct device-to-device, D2D, communication.

Now, in order to provide session continuity for the ongoing data session A according to this first scenario, i.e. when leaving the radio coverage of the radio access node 110, signalling according to the signalling diagram depicted in FIG. 3 may be performed.

FIG. 3 is a simplified, illustrated example of actions or operations which may be taken by the involved nodes and wireless devices in the scenario of FIG. 2.

Action 300

The first wireless device 121 has a data session A ongoing with the external network node 160 via the first PGW 151 and the radio access node 110 (not shown in FIG. 3) in the radio communications network 100.

Action 301

The first wireless device 121 discovers radio connectivity towards the second wireless device 122 (e.g. via D2D functionality), which is capable of operating as a relay node for the ongoing data session A between the first wireless device 121 and the radio communications network 100.

Action 302

In this action, the first wireless device 121 determines that the ongoing data session is to be relayed via the second wireless device 122. For example, the determination may be based on that the first wireless device 121 detects that it is moving out of radio coverage of the radio access node 110, i.e. that it is about to lose its radio connection with the radio access node 110. The first wireless device 121 negotiates the relay service with the second wireless device 122, preferably over a D2D link for D2D communication. In this connection, the second wireless device 122 may send an identifier to the first wireless device 121, which identifier indicates the identity of the second wireless device 122.

Action 303

In this action, the first wireless device 121 transmits a relay request message to a Proximity Service function, ProSe, node 131 in the radio communications network 100 wherein the first wireless device 121 is registered.

The relay request message comprises relay information indicating that the ongoing data session A is to be relayed via the second wireless device 122 with session continuity towards the first PGW 151 serving the first wireless device 121. It is preferred that the relay information comprises information indicating the identity of the first wireless device 121, for example indicating a ProSe User ID for the device 121 and/or the IP-address of the device 121 and/or some other identifier that is unique for the device 121 within the communication system 100. Additionally or alternatively, the relay information may indicate the identity of the second wireless device 122, for example, by comprising the identifier received from the second wireless device 122.

The relay request message is preferably transmitted via the second wireless device 122 over the user plane (as indicated by the fully drawn arrow in FIG. 2). Alternatively, for example, if the connection to the network node 110 has not yet been lost, the relay request message may instead be sent via the network node 110 and using the PDN Connection of the first wireless device 121 (as indicated by the dashed arrows in FIG. 2).

Action 304

Upon receiving the relay request message, the ProSe function node 131 obtains, preferably based on the relay information or other information already available to the ProSE function node 131, mobility information indicating the MME 141 serving the first wireless device 121. For example, the ProSe function node 131 may use information indicating the identity of the first wireless device 121 (e.g. comprised by the relay information received in the relay request of action 303) to retrieve information indicating the MME 141 serving the first wireless device 121.

Action 305

In this action, the ProSe function node 131 transmits a first tunnel request message to the MME 141. The first tunnel request message comprises information, e.g. the received relay information, indicating that the ongoing data session A is to be relayed via the second wireless device 122. Thus, the ProSe function node 131 may send a message to the MME 141 serving the first wireless device 122 indicating that remote forwarding is needed via the second wireless device 122 for the ongoing data session A, e.g. an indicator indicating "Remote Forwarding Needed" may be used.

If the IP address of the second wireless device 122 is available to the ProSe function 131, e.g. in the relay information received in action 303 or in the mobility information obtained in action 304, then the ProSe function node 121 may include this in the relay information to the MME 141. It should be noted that the IP address of the second wireless device 122 may also be stored in the MME 141. Alternatively, the IP address of the second wireless device 122 may be stored in the PGW 152 of the second wireless device 122.

Action 306

Upon receiving the first tunnel request message from the ProSe function node 131, the MME 141 obtains gateway information indicating a second PGW 152 serving the second wireless device 122, preferably using the information received in the tunnel request of action 305.

If the ProSe function node 131 is not serving the second wireless device 122, this may be performed by the MME 141 by, for example, signalling with another ProSe function node (not shown) serving the second wireless device 122. It should be noted that the second wireless device 122 should already have been in contact with and be registered in the other ProSe function node, or in the ProSe function node 131, in order for it to be authorized to act as a relay node. This may also be performed by the MME 141 by signalling with a Home Subscriber Server/Home Location Register, HSS/HLR.

Action 307

In this action, the MME 141 transmits a second tunnel request message to the first PGW 151 (serving the first wireless device 121) indicating that it is to tunnel data packets of the ongoing data session A via the second PGW 152 (serving the second wireless device 122) based on the gateway information obtained in action 306. The MME 141 may thus indicate to the first PGW 151 to tunnel downlink data packets of the ongoing data session A of the first wireless device 121 towards the second wireless device 122 via the second PGW 152 serving the second wireless device 122.

Optionally, the MME 141 may also transmit a second tunnel request message to the PGW 152 indicating that it is to tunnel data packets of the ongoing data session A via the PGW 151. Thus, the MME 141 may indicate to the PGW 152 to tunnel uplink data packets of the ongoing data session A of the first wireless device 121 to the PGW 151. This may be referred to herein as reverse tunneling.

Actions 308-311

In the actions 308-311 are optional. However, in one or more or all of the actions 308, 309, 310 and 311 the PGW 151, the MME 141 the ProSe function node 131, and the second wireless device 122 respectively may acknowledge the receipt of their respectively received request messages.

Action 312

Here, after receiving the second tunnel request message from the MME 141 indicating that it is to tunnel data packets of the ongoing data session A via a second gateway node, the PGW 151 sets up a tunnel 180 for the ongoing data session A such that the data packets of the ongoing data session A passes via the first PGW 151 and the second PGW 152. This enables downlink data packets of the ongoing data session A for the first wireless device 121 to be tunneled from the PGW 151 to the second wireless device 122 through the existing Packet Data Network, PDN, connection between the second PGW 152 and the second wireless device 122. This can be performed while keeping the assigned IP address of the first wireless device 121 inside the tunnel 180.

This may be performed using so-called IP-to-IP tunneling, i.e. the PGW 151 tunnels the downlink data packets of the ongoing data session A of the first wireless device 121 directly to the second wireless device 122 routed via the PGW 152. The tunnel signalling of the tunnel 180 may, for example, be performed over a GPRS Tunnel Protocol, GTP, via a Serving Gateway, SGW (not shown). Here, the PGW 151 and the second wireless device 122 may encapsulate the data packets in Generic Routing Encapsulation, GRE, IP data packets addressed to each other.

Alternatively, the PGW 151 may set up the tunnel 180 between the PGW 151 and the PGW 152, wherein the PGW 152 forwards the downlink data packets of the ongoing data session A of the first wireless device 121 to the second wireless device 122, which in turn forwards (relays) the downlink packets to the first wireless device 121. Here, it is preferred that the first PGW 151 encapsulates the downlink packets in a new packet addressed to the second PGW 152. Similarly, it is preferred that the second PGW 152 encapsulates the downlink packets received from the first PGW 151 in a new packet addressed to the second wireless device 122, though the second PGW 152 may remove the encapsulation made by the PGW 151 from the received packets before encapsulating them again. Similarly, it is preferred that the second wireless device 122 removes the encapsulation made by the PGW 152 from the downlink packets received from the second PGW 152 and then forwards (relays) them to the first wireless device 121. This alternative may be advantageous when it is preferable to use separate bearers for the ongoing data session A of the first wireless device 121 being relayed and other data sessions of the second wireless device 122 in order to apply different Quality-of-Service requirements or different policy and charging functions, etc.

Since there is a limit to the number of PDN connections that may be set up between a wireless device and a PGW, this advantageously requires no new PDN connection to be set up between the second wireless device 122 and the PGW 151 in order to maintain the ongoing data session A when relaying it via the second wireless device 122.

Action 313

After the setup in Action 312, the PGW 151 may transceive data packets of the ongoing data session A of the first wireless device 121 with the second wireless device 122 via the tunnel 180. This is shown by the dotted arrow 313 in FIG. 3.

As already indicated above, upon receiving the encapsulated downlink tunnel data packets from the PGW 151 via the PGW 152 serving the second wireless device 122, the second wireless device 122 decapsulates the received encapsulated downlink tunnel data packets to obtain downlink data packets of the ongoing data session A to the first wireless device 121. Then, the second wireless device 122 transmits the downlink data packets of the ongoing data session A to the first wireless device 121 using D2D communication over the D2D link.

In other words, the second wireless device 122 may strip off (takes away) the previous encapsulation of the data packet, i.e. decapsulate the encapsulated data packets addressed to the second wireless device 122, and transmit the enclosed downlink data packet of the ongoing data session A addressed to the first wireless device 121 over the D2D link to the first wireless device 121.

It should also be noted that, for uplink data packets, the first wireless device 121 may encapsulate uplink data packets of the ongoing data session A addressed to the PGW 151. The first wireless device 121 may then transmit the encapsulated uplink data packets over the D2D link to the second wireless device 121, which may forward it directly to the PGW 151 or the PGW 152 over the tunnel 180. This may be performed by the PGW 151 having a specific IP address to which the first wireless device 121 addresses the encapsulated data packets. The specific IP address of the PGW 151 may, for example, be notified to the first wireless device 121 when performing an attach procedure in the radio communications network 100, or during the tunnel setup procedure, e.g. via response messages.

FIG. 4 illustrates the result of the signalling in FIG. 3. To the left, it is illustrated how the first wireless device 121 has left the radio coverage of the network node 110 and that the ongoing data session A, after the signalling in FIG. 3 has been performed, is relayed via the second wireless device 122. The resulting data path of the ongoing data session A is illustrated to the right in FIG. 4.

Figure 6:
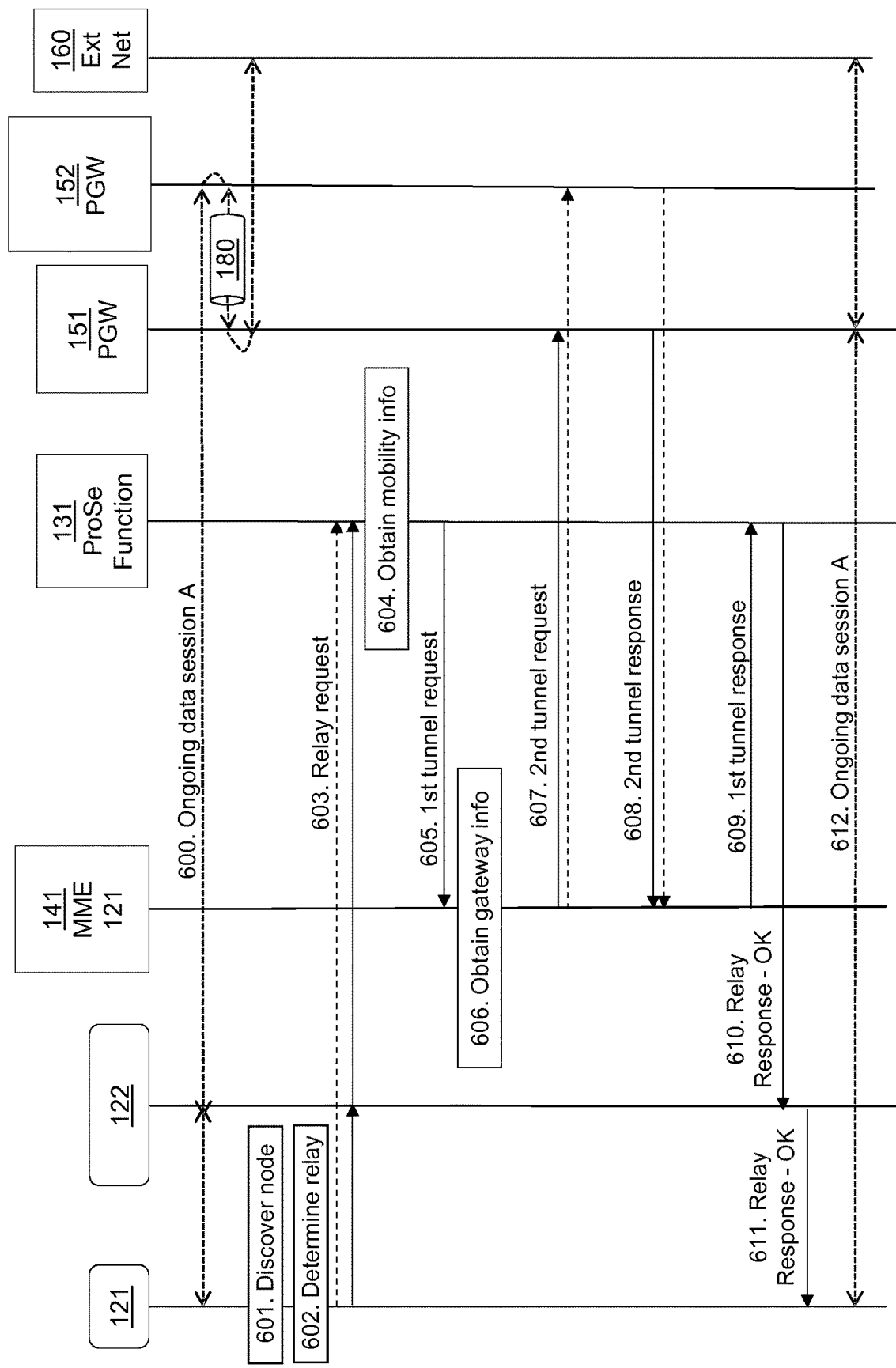
FIG. 6 is a signalling diagram for relaying an ongoing data session in the second scenario of FIG. 5 according to embodiments of a first and second wireless device, a ProSe function node, an MME and gateway nodes in a radio communications network.

FIGS. 5-7 shows schematic block diagrams and a signalling diagram which illustrate a second scenario for relaying an ongoing data session in a radio communications network 100. In this second scenario, the first radio access node is the second wireless device 122 and the second radio access node is the radio access node 110. Also, the first gateway node is the PGW 151 of the first wireless device and the second gateway node is the PGW 152 of the second wireless device.

In FIG. 5, the first wireless device 121 is about to enter the radio coverage of the radio access node 110 when having an ongoing data session being relayed via the second wireless device 122. The entering is illustrated to the left in FIG. 5 by the double dashed arrow. Here, due to the signalling described with reference to FIG. 3 above, the first wireless device 121 has an ongoing data session A being relayed via the second wireless device 122 and tunneled towards the PGW 151. This is illustrated to the right in FIG. 5 by the dashed arrow.

In order to provide session continuity for the ongoing data session A according to this scenario, i.e. when entering the radio coverage of the radio access node 110, signalling according to the signalling diagram depicted in FIG. 6 may be performed.

FIG. 6 is a simplified, illustrated example of actions or operations which may be taken by the involved nodes and wireless devices in the scenario of FIG. 5.

Action 600

The first wireless device 121 has a data session A ongoing with the external network node 160 via the first PGW 151 and relayed via the second wireless device 122 and tunneled via tunnel 180 towards the second PGW 152.

Action 601

The first wireless device 121 discovers that it is in coverage of the radio access node 110 and is able to establish a connection to the radio access node 110.

Action 602

The first wireless device 121 detects that it is moving into radio coverage of the network node 110 and establish a radio connection via the network node 110, for example, by performing an attach procedure according to 3GPP TS 23.401 V9.4.0.

Action 603

In this action, the first wireless device 121 transmits a relay request message to a Proximity Service function, ProSe, node 131 in the radio communications network 100 wherein the first wireless device 121 is registered. This action corresponds to Action 303 described above with reference to FIG. 3, except that in this case, the relay information indicate that the ongoing data session A is to be relayed via the radio access node 110 with session continuity towards the PGW 151. The relay request message may be transmitted via the second wireless device 122 (as indicated by the fully drawn arrows in FIG. 6). Alternatively, if the connection to the network node 110 has already been established, the relay request message may be sent via the network node 110 (as indicated by the dashed arrow in FIG. 6).

Action 604

Upon receiving the relay request message, the ProSe function node 131 obtains mobility information indicating a MME 141, serving the first wireless device 121. For example, the ProSe function node 131 may use the identity of the first wireless device 121 to retrieve information indicating the MME 141 serving the first wireless device 121. This action corresponds to Action 304 described above with reference to FIG. 3.

Action 605

In this action, the ProSe function node 131 may transmit a first tunnel request message to the MME 141. The first tunnel request message comprises information, e.g. the received relay information, indicating that the ongoing data session A is to be relayed via the radio access node 110. This means that the ProSe function node 131 may send a message to the MME 141 serving the first wireless device 122 indicating that remote forwarding, i.e. relaying via the second wireless device 122, is not needed any more for the ongoing data session A.

Action 606

Upon receiving the first tunnel request message from the ProSe function node 131, the MME 141 obtains gateway information indicating the PGW 152 serving the second wireless device 122, preferably using the information received in the tunnel request of action 605.

Action 607

In this action, the MME 141 transmits a second tunnel request message to the PGW 151 (serving the first wireless device 121) indicating that it is to stop tunneling data packets of the ongoing data session A via the PGW 152 according to the obtained gateway information. The MME 141 may thus indicate to the PGW 151 to stop tunnel downlink data packets of the ongoing data session A of the first wireless device 121 towards the second wireless device 122 via its PGW 152. Optionally, the MME 141 may also transmit a second tunnel request message to the PGW 152 indicating that it is to stop tunnel data packets of the ongoing data session A via the PGW 151. Thus, the MME 141 may indicate to the PGW 152 to stop tunnel uplink data packets of the ongoing data session A of the first wireless device 121 to the PGW 151.

Actions 608-611

In these optional actions, the PGW 151, PGW 152, the MME 141, the ProSe function node 131, and the second wireless device 122 may each acknowledge the receipt of their respectively received request messages.

Action 612

Here, after receiving the second tunnel request message from the MME 141, the PGW 151 may proceed with the ongoing data session A directly with the first wireless device 121 over a conventional PDN connection. This is shown by the dotted arrow 612 in FIG. 6.

FIG. 7 illustrates the result of the signalling in FIG. 6. To the left it is illustrated how the first wireless device 121 has moved into the radio coverage of the network node 110 when having had an ongoing data session being relayed via the second wireless device 122. The resulting data path of the ongoing data session A is illustrated to the right in FIG. 7 and is identical to the data path shown in FIG. 2.

Figure 9:
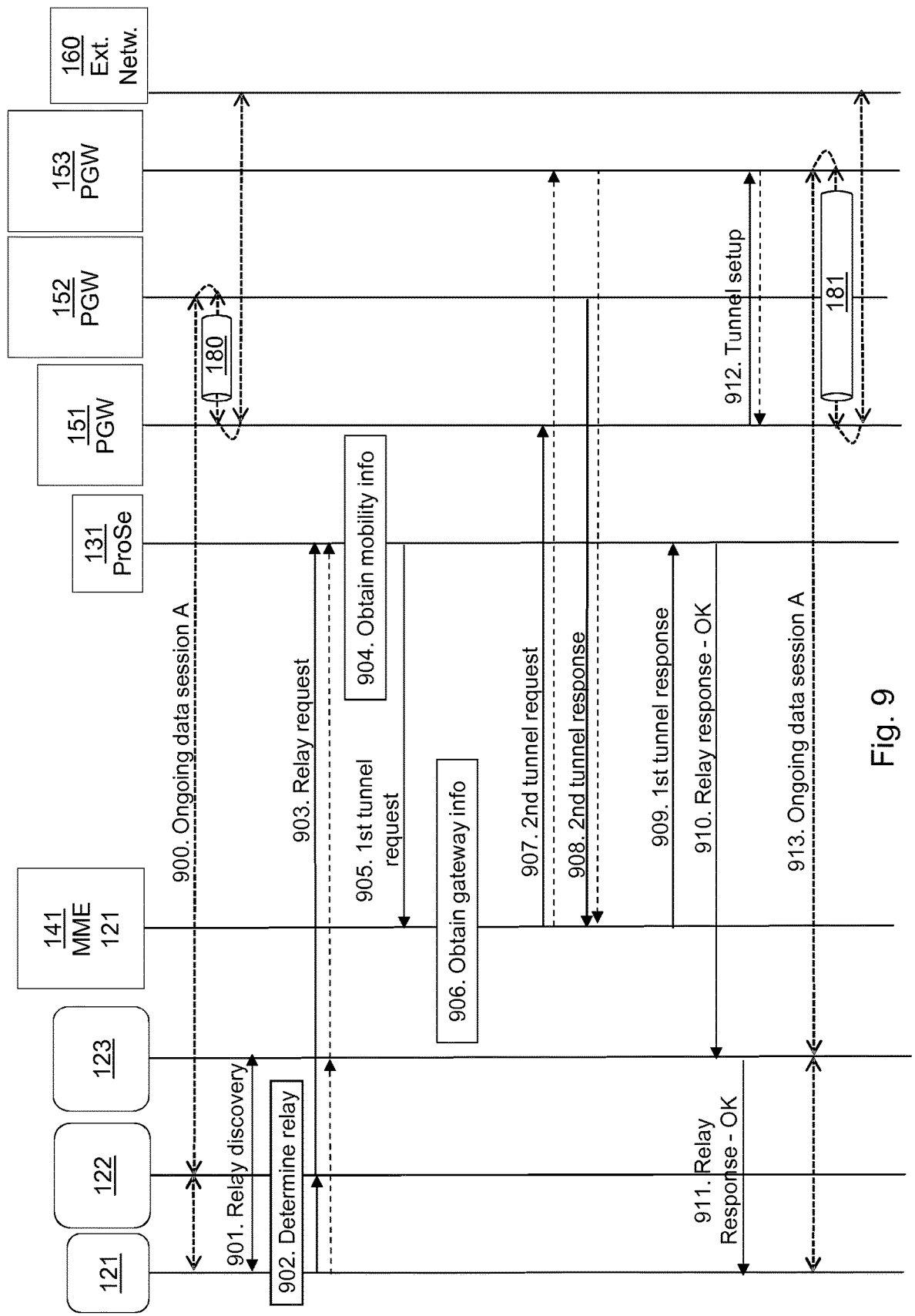
FIG. 9 is a signalling diagram for relaying an ongoing data session in the third scenario of FIG. 8 according to embodiments of a first and second wireless device, a ProSe function node, an MME and gateway nodes in a radio communications network.

FIGS. 8-10 shows schematic block diagrams and a signalling diagram which illustrate a third scenario for relaying an ongoing data session in a radio communications network 100. In this second scenario, the first radio access node is the second wireless device 122 and the second radio access node is a third wireless device 123. Also, the first gateway node is the PGW 151, the second gateway node is the PGW 152 and a third gateway node is PGW 153.

In FIG. 8, the first wireless device 121 switches between having the ongoing data session being relayed via the second wireless device 122 to instead having the ongoing data session being relayed via a third wireless device 123. Here, due to the signalling described with reference to FIG. 3 above, the first wireless device 121 may have an ongoing data session A being relayed via the second wireless device 122 and tunneled between second wireless device 122 and the PGW 151. The data session A is illustrated to the right in FIG. 8 by the dashed arrow.

In order to provide session continuity for the ongoing data session A according to this scenario, i.e. when switching between wireless devices relaying the ongoing data session A, signalling according to the signalling diagram depicted in FIG. 9 may be performed. FIG. 9 is a simplified, illustrated example of actions or operations which may be taken by the involved nodes and wireless devices in the scenario of FIG. 8.

Action 900

The first wireless device 121 has a data session A that is ongoing towards PGW 151 being relayed via the second wireless device 122 and tunneled via tunnel 180 towards PGW 151. This is the same situation as the resulting relaying situation discussed above with reference to the right figure in FIG. 5.

Action 901

The first wireless device 121 discovers radio connectivity towards the third wireless device 123 (e.g. via D2D functionality), which is capable of operating as a relay node for the ongoing data session A between the first wireless device 121 and the radio communications network 100.

Action 902

In this action, the first wireless device 121 determines that the ongoing data session is to be relayed via the third wireless device 123. For example, the determination may be based on that the first wireless device 121 detects that it is about to lose its radio connection with the second wireless device 122. The first wireless device 121 negotiates a relay service with the third wireless device 122, preferably over a D2D link for D2D communication. The third wireless device 122 may send an identifier to the first wireless device 121, which identifier indicates the identity of the third wireless device 123.

Action 903

In this action, the first wireless device 121 transmits a relay request message to the Proximity Service function, ProSe, node 131 in the radio communications network 100 wherein the first wireless device 121 is registered.

The relay request message comprises relay information indicating that the ongoing data session A is to be relayed via the third wireless device 123 with session continuity towards the PGW 151 serving the first wireless device 121. It is preferred that the relay information comprises information indicating the identity of the first wireless device 121, for example indicating a ProSe User ID for the device 121 and/or the IP-address of the device 121 and/or some other identifier that is unique for the device 121 within the communication system 100. Additionally or alternatively, the relay information may indicate the identity of the third wireless device 123, for example, by comprising the identifier received from the third wireless device 123. The relay request message is preferably transmitted via the third wireless device 123 over the user plane (as indicated by the fully drawn arrow in FIG. 9). Alternatively, for example, if the connection via the second wireless device 122 has not yet been lost, the relay request message may instead be sent via the second wireless device 122 over the user plane (as indicated by the dashed arrows in FIG. 9).

Action 904

Upon receiving the relay request message, the ProSe function node 131 obtains, preferably based on the relay information or other information already available to the ProSE function node 131, mobility information indicating the MME 141 serving the first wireless device 121. For example, the ProSe function node 131 may use information indicating the identity of the first wireless device 121 (e.g. comprised by the relay information received in the relay request of action 903) to retrieve information indicating the MME 141 serving the first wireless device 121.

Action 905

In this action, the ProSe function node 131 transmits a first tunnel request message to the MME 141. The first tunnel request message comprises information, e.g. the received relay information, indicating that the ongoing data session A is to be relayed via the third wireless device 123. Thus, the ProSe function node 131 may send a message to the MME 141 serving the first wireless device 121 indicating that remote forwarding is needed via the third wireless device 123 for the ongoing data session A, e.g. an indicator indicating "Remote Forwarding Needed" may be used.

If the IP address of the third wireless device 123 is available to the ProSe function 131, e.g. in the relay information received in action 903 or in the mobility information obtained in action 903, then the ProSe function node 121 may include this in the relay information to the MME 141. It should be noted that the IP address of the third wireless device 123 may also be stored in the MME 141. Alternatively, the IP address of the third wireless device 123 may be stored in the PGW 153 of the third wireless device 123.

Action 906

Upon receiving the first tunnel request message from the ProSe function node 131, the MME 141 obtains gateway information indicating a PGW 153 serving the third wireless device 123, preferably using the information received in the tunnel request of action 905.

Action 907

In this action, the MME 141 transmits a second tunnel request message to the first PGW 151 (serving the first wireless device 121) indicating that it is to tunnel data packets of the ongoing data session A via the PGW 153 (serving the third wireless device 121) based on the gateway information obtained in action 306. The MME 141 may thus indicate to the PGW 151 to tunnel downlink data packets of the ongoing data session A of the first wireless device 121 towards the third wireless device 123 via PGW 153 serving the third wireless device 123.

Optionally, the MME 141 may also transmit a second tunnel request message to the PGW 153 indicating that it is to tunnel data packets of the ongoing data session A via the PGW 151. Thus, the MME 141 may indicate to the PGW 153 to tunnel uplink data packets of the ongoing data session A from the first wireless device 121 to the PGW 151. This may be referred to herein as reverse tunneling.

Actions 908-911

In these optional actions, the PGW 151, PGW 153, the MME 141, the ProSe function node 131, and the third wireless device 123 may each acknowledge the receipt of their respectively received request messages.

Action 912

Here, after receiving the second tunnel request message from the MME 141 indicating that it is to tunnel data packets of the ongoing data session A via PGW 153, the PGW 151 sets up a tunnel 181 for the ongoing data session A such that the data packets of the ongoing data session A passes via the first PGW 151 and the PGW 153. This may be performed in the same or similar manner as described above for the second wireless device 122 in Action 312.

Action 913

After the setup in Action 912, the PGW 151 may transceive data packets of the ongoing data session A of the first wireless device 121 with the third wireless device 123 via the tunnel 181. This is shown by the dotted arrow 913 in FIG. 9, and may be performed by the third wireless device 123 and the PGW 153 in the same or similar manner as described above for the second wireless device 122 and the PGW 153 in Action 313.

FIG. 10 illustrates the result of the signalling in FIG. 9. To the left, it is illustrated how the first wireless device 121 has switched between having the ongoing data session A relayed via the second wireless device 122 to instead having the ongoing data session A relayed via a third wireless device 123.

Figure 11:
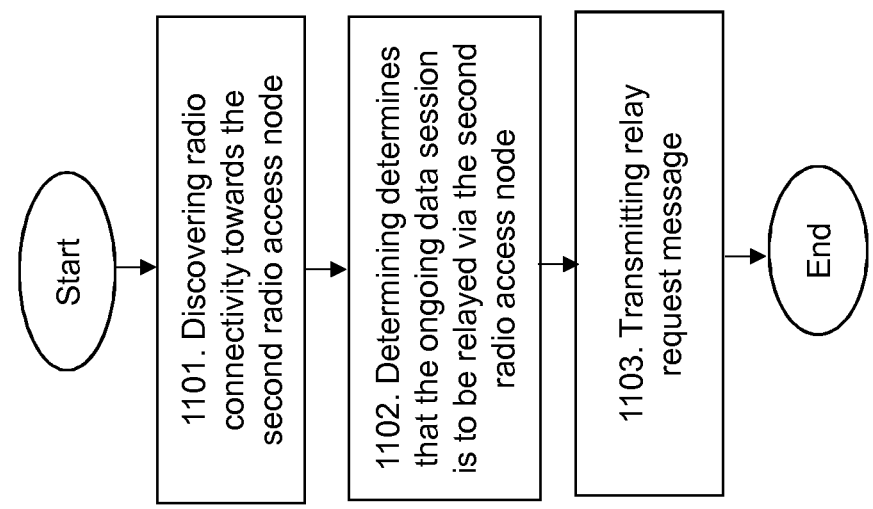
FIG. 11 is a flowchart depicting embodiments of a method in a first wireless device.

Example of embodiments of methods performed by a first wireless device 121 for relaying a data session via a second radio access node 122, 110, 123 in a radio communications network 100 wherein said data session is ongoing towards a first gateway node 151 via a first radio access node 110, 122, will now be described with reference to the flowchart depicted in FIG. 11. FIG. 11 is a simplified, illustrated example of actions or operations which may be taken by the wireless device 121.

Action 1101

In this action, the first wireless device 121 discovers radio connectivity towards the second radio access node 122, 110, 123. This action is exemplified by the signalling in Actions 301, 601, 901 described with reference to FIGS. 2-10.

Action 1102

Here, the first wireless device 121 determines that the ongoing data session is to be relayed via the second radio access node 122, 110, 123. This action is exemplified by the signalling in Actions 302, 602, 902 described with reference to FIGS. 2-10.

Action 1103

The first wireless device 121 then transmits a relay request message, to a proximity service function, ProSe, node 131 configured to operatively manage relaying of data sessions in the radio communications network 100, comprising relay information indicating that the ongoing data session is to be relayed via the second radio access node 122, 110, 123 with session continuity towards the first gateway node 151 serving the first wireless device 121. This action is exemplified by the signalling in Actions 303, 603, 903 described with reference to FIGS. 2-10.

In some embodiments, the relay information further indicates that data packets of the ongoing data session is to be at least partly tunneled between the first gateway node 151 and the second radio access node 122, 110, 123. In some embodiments, the relay information further indicates the identity of the second radio access node 122, 110, 123.

In some embodiments, the first radio access node is a radio access node 110 serving a cell of the radio communication network 100. This is shown above by the examples of embodiments in FIGS. 2-4. In some embodiments, the second radio access node is a radio access node 110 serving a cell of the radio communication network 100. This is shown above by the examples of embodiments in FIGS. 5-7.

Furthermore, in some embodiments, the first radio access node is a second wireless device 122, wherein said second wireless device 122 is capable of operating as a relay node of data transmissions between the first wireless device 121 and the radio communications network 100. This is shown above by the examples of embodiments in FIGS. 2-4. In some embodiments, the second radio access node is a third wireless device 123, wherein said third wireless device 123 is capable of operating as a relay node of data transmissions between the first wireless device 121 and the radio communications network 100. This is shown above by the examples of embodiments in FIGS. 8-10.

In some embodiments, the first wireless device 121 may receive downlink data packets of the ongoing data session towards the first gateway node 151 via the first gateway node 151 and the second radio access node 122, 110, 123. Also, in some embodiments, the first wireless device 121 may transmit uplink data packets of the ongoing data session towards the first gateway node 151 via the second radio access node 122, 110, 123 by encapsulating the uplink data packets of the ongoing data session towards the first gateway node 151 in uplink tunnel data packets addressed to the first gateway node 151.

Figure 12:
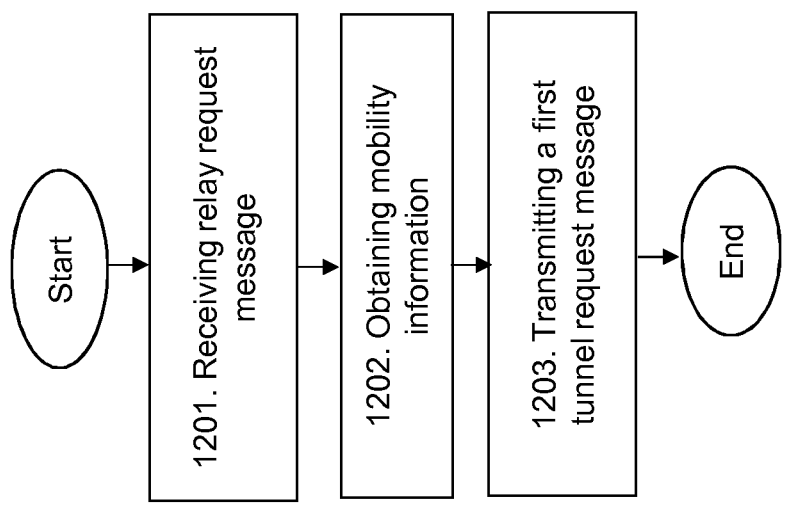
FIG. 12 is a flowchart depicting embodiments of a method in a ProSe function node.

Example of embodiments of methods performed by a ProSe function node 131 for enabling relaying of a data session of a first wireless device 121 via a second radio access node 122, 110, 123 in the radio communications network 100, will now be described with reference to the flowchart depicted in FIG. 12. The ProSe, function node 131 is generally configured to operatively manage relaying of data sessions in the radio communications network 100, e.g. manage relaying of an ongoing data session for the first wireless device 121 via the second wireless device 122. FIG. 12 is a simplified, illustrated example of actions or operations which may be taken by the ProSe function node 131.

Action 1201

In this action, the ProSe function node 131 receives relay request message, from the first wireless device 121, comprising relay information indicating that the ongoing data session is to be relayed via the second radio access node 122, 110, 123 with session continuity towards the first gateway node 151. This action is exemplified by the signalling in Actions 303, 603, 903 described with reference to FIGS. 2-10.

Action 1202

Here, the ProSe function node 131 obtains mobility information indicating a Mobility Management Entity, MME 141, serving the first wireless device 121. This action is exemplified in Actions 304, 604, 904 described with reference to FIGS. 2-10.

Action 1203

The ProSe function node 131 transmits a first tunnel request message, to the MME 141, comprising the received relay information indicating that the ongoing data session is to be relayed via the second radio access node 122, 110, 123. This action is exemplified by the signalling in Actions 305, 605, 905 described with reference to FIGS. 2-10.

Figure 13:
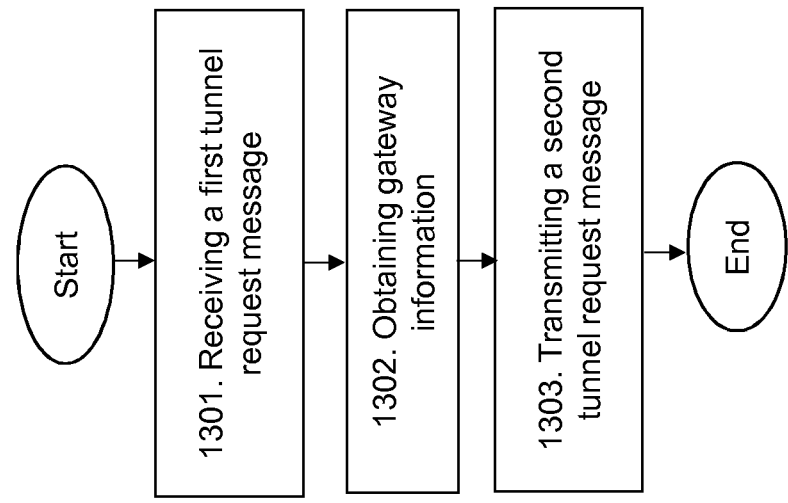
FIG. 13 is a flowchart depicting embodiments of a method in a MME.

Example of embodiments of methods performed by a Mobility Management Entity, MME 141, for enabling relaying of a data session of a first wireless device 121 via a second radio access node 122, 110, 123 in a radio communications network 100, wherein said data session is ongoing towards a first gateway node 151 via a first radio access node 110, 122 in the radio communications network 100, will now be described with reference to the flowchart depicted in FIG. 13. FIG. 13 is a simplified, illustrated example of actions or operations which may be taken by the MME 141.

Action 1301

In this action, the MME 141 receives a first tunnel request message, from a proximity service, ProSe, function node 131 configured to operatively manage relaying of data sessions in the radio communications network 100, comprising relay information indicating that the ongoing data session is to be relayed via the second radio access node 122, 110, 123. This action is exemplified by the signalling in Actions 305, 605, 905 described with reference to FIGS. 2-10.

Action 1302

Here, the MME 141 obtains gateway information indicating a second gateway node 152, 153 serving the second radio access node 122, 110, 123 using the received relay information. This action is exemplified in Actions 306, 606, 906 described with reference to FIGS. 2-10.

Action 1303

The MME 141 transmits a second tunnel request message to the first gateway node 151 indicating that it is to tunnel data packets of the ongoing data session via the second gateway node 152, 153 according to the obtained gateway information. For example, the MME 141 may indicate to the first gateway node to tunnel downlink data packets of an ongoing data session A of the first wireless device towards the second radio access node via the second gateway node 152 serving the second radio access node. This action is exemplified by the signalling in Actions 307, 607, 907 described with reference to FIGS. 2-10.

Example of embodiments of methods performed by a first gateway node 151 for enabling relaying of a data session of a first wireless device 121 via a second radio access node 122, 110, 123 in a radio communications network 100, wherein said data session is ongoing towards the first gateway node 151 via a first radio access node 110, 122 in the radio communications network 100, will now be described with reference to the flowchart depicted in FIG. 14. FIG. 14 is a simplified, illustrated example of actions or operations which may be taken by the first gateway node 151.

Action 1401

In this action, the first gateway node 151 receives a second tunnel request message, from a MME 141, indicating that it is to tunnel data packets of the ongoing data session via a second gateway node 152, 153. This action is exemplified by the signalling in Actions 307, 607, 907 described with reference to FIGS. 2-10.

Action 1402

Here, the first gateway node 151 sets up a tunnel 180, 181 via the second gateway node 152, 153 for the ongoing data session, such that the data packets of the ongoing data session passes via the first gateway node and the second gateway node. This action is exemplified by the signalling in Actions 312, 612, 912 described with reference to FIGS. 2-10.

Action 1403

The, the first gateway node 151 transceive, i.e. receive and/or transmit, data packets of the ongoing data session with the second radio access node 122, 110, 123 using the tunnel 180, 181. This action is exemplified by the signalling in Actions 313, 613, 913 described with reference to FIGS. 2-10.

In some embodiments, the first gateway node 151 may transceive the data packets by transmitting downlink data packets of the ongoing data session to the first wireless device 121 by encapsulating the downlink data packets towards the first wireless device 121 in downlink tunnel data packets addressed to the second radio access node 122, 110, 123. In some embodiments, the first gateway node 151 may transceive the data packets by receiving uplink data packets of the ongoing data session from the first wireless device 121 by decapsulating uplink tunnel data packets addressed to the first gateway node 151.

Example of embodiments of methods performed by a second wireless device 122 for relaying a data session between a first wireless device 121 and a first gateway node 151 in a radio communications network 100, said second wireless device 122, 123 being capable of operating as a relay node for the first wireless device (121) in the radio communications network 100 by using Device-to-Device, D2D, communication with the first wireless device 121, will now be described with reference to the flowchart depicted in FIG. 15. FIG. 15 is a simplified, illustrated example of actions or operations which may be taken by the second wireless device 122. This is also exemplified by the signalling in Actions 313, 613, 913 described with reference to FIGS. 2-10.

Action 1501

In this action, the second wireless device 122 receives encapsulated downlink tunnel data packets from the first gateway node 151 via a second gateway node 152, 153 serving the second wireless device 122, 123.

Action 1502

Here, the second wireless device 122 decapsulates the received encapsulated downlink tunnel data packets to obtain downlink data packets of the ongoing data session to the first wireless device 121. Typically, decapsulation means that the second wireless device 122 strips off (takes away) previous encapsulation of a data packet.

Action 1503

The, the first gateway node 151 transmits the downlink data packets of the ongoing data session to the first wireless device 121, preferably using D2D communication.

Figure 16:
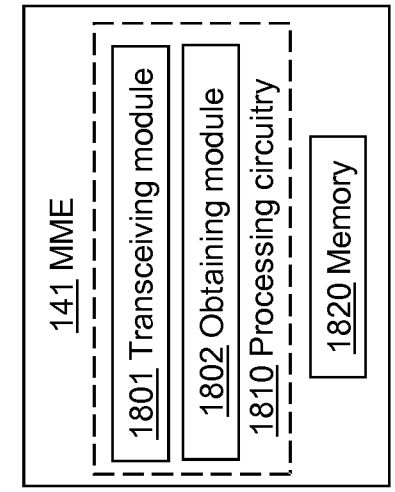
FIG. 16 is a schematic block diagram depicting embodiments of a first wireless device.

To perform the method actions in the first wireless device 121 for relaying a data session via a second radio access node 122 in a radio communications network 100, wherein said data session is ongoing towards a first gateway node 151 via a first radio access node 110, 122 in the radio communications network 100, the first wireless device 121 may comprise the following arrangement depicted in FIG. 16. FIG. 16 shows a schematic block diagram of embodiments of the first wireless device 121. In some embodiments, the first wireless device 121 may comprise a discovering module 1601, a determining module 1602, and a transceiving module 1603. In some embodiments, the first wireless device 121 may comprise a processing circuitry 1610, which may also be referred to as processing module, processing unit or processor. The processing circuitry 1610 may comprise one or more of the discovering module 1601, determining module 1602 and transceiving module 1603, and/or perform the function thereof described below.

The first wireless device 121 is configured to, e.g. by means of the discovering module 1601, discover radio connectivity towards the second radio access node 122, 110, 123. Also, the first wireless device 121 is configured to, e.g. by means of the determining module 1602, determine that the ongoing data session is to be relayed via the second radio access node 122, 110, 123. Further, the first wireless device 121 is configured to, e.g. by means of the transceiving 1603, transmit a relay request message, to a ProSe function node 131 configured to operatively manage relaying of data sessions in the radio communications network 100. The relay request message comprising relay information indicating that the ongoing data session is to be relayed via the second radio access node 122, 110, 123 with session continuity towards the first gateway node 151.

In some embodiments, the relay information further indicates that data packets of the ongoing data session is to be at least partly tunneled between the first gateway node 151 and the second radio access node 122, 110, 123. In some embodiments, the relay information further indicates the identity of the second radio access node 122, 110, 123.

In some embodiments, the first radio access node or the second radio access node is a network node 110 serving a cell in the radio communication network 100. In some embodiments, the first radio access node and/or the second radio access node is a second or third wireless device 122, 123. In this case, the second and third wireless device 122, 123 are capable of operating as a relay node of data transmissions between the first wireless device 121 and the radio communications network 100.

In some embodiments, the first wireless device 121/the transceiving module 1603 may be configured to, receive downlink data packets of the ongoing data session towards the first gateway node 151 via the first gateway node 151 and the second radio access node 122, 110, 123. In some embodiments, the first wireless device 121/the transceiving module 1603 may be configured to, transmit comprising uplink data packets of the ongoing data session towards the first gateway node 151 via the second radio access node 122, 110, 123 by encapsulating the uplink data packets of the ongoing data session towards the first gateway node 151 in uplink tunnel data packets addressed to the first gateway node 151.

The embodiments for relaying a data session via a second radio access node 122 in a radio communications network 100, wherein said data session is ongoing towards a first gateway node 151 via a first radio access node 110, 122, may be implemented through one or more processors, such as, e.g. the processing circuitry 1610 in the first wireless device 121 depicted in FIG. 16, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1610 in the first wireless device 121. The computer program code may e.g. be provided as pure program code in the first wireless device 121 or on a server and downloaded to the first wireless device 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The first wireless device 121 may further comprise a memory 1620, which may be referred to or comprise one or more memory modules or units. The memory 1620 may be arranged to be used to store executable instructions and data to perform the methods described herein when being executed in the first wireless device 121. Those skilled in the art will also appreciate that the processing circuitry 1610 and the memory 1620 described above may refer to a combination of analog and digital circuits, and/or one or more processors configured with software and/or firmware, e.g. stored in the memory 1620, that when executed by the one or more processors such as the processing circuitry 1610 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry 1610 or modules 1601-1602, cause the at least one processor to carry out the method for relaying a data session via a second radio access node 122 in a radio communications network 100. Also, some embodiments may, as described above, further comprise a carrier containing said computer program, wherein the carrier is one of an electronic signal, optical signal, radio signal, or computer readable storage medium.

Figure 17:
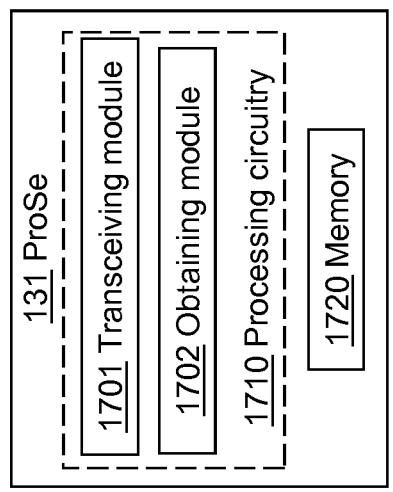
FIG. 17 is a schematic block diagram depicting embodiments of a ProSe function node.

To perform the method actions for enabling relaying of a data session of a first wireless device 121 via a second radio access node 122, 110, 123 in the radio communications network 100, wherein said data session is ongoing towards a first gateway node 151 via a first radio access node 110, 122 in a radio communications network 100, the proximity service, ProSe, function node 131 may comprise the following arrangement depicted in FIG. 17. The ProSe, function node 131 is configured to operatively manage relaying of data sessions in the radio communications network 100.

FIG. 17 shows a schematic block diagram of embodiments of the ProSe function node 131. In some embodiments, the ProSe function node 131 may comprise a transceiving module 1701, and a obtaining module 1702. In some embodiments, the ProSe function node 131 may comprise a processing circuitry 1710, which may also be referred to as processing module, processing unit or processor. The processing circuitry 1710 may comprise one or more of the transceiving module 1701 and the obtaining module 1702, and/or perform the function thereof described below.

The ProSe function node 131 is configured to, e.g. by means of the transceiving module 1701, receive relay request message from the first wireless device 121 comprising relay information indicating that the ongoing data session is to be relayed via the second radio access node 122, 110, 123 with session continuity towards the first gateway node 151. Also, the ProSe function node 131 is configured to, e.g. by means of the obtaining module 1702, obtain mobility information indicating a MME 141 serving the first wireless device 121. Further, the ProSe function node 131 is configured to, e.g. by means of the transceiving module 1701, transmit a first tunnel request message to a MME 141 serving the first wireless device 121 comprising the received relay information indicating that the ongoing data session is to be relayed via the second radio access node 122, 110, 123.

Figure 18:
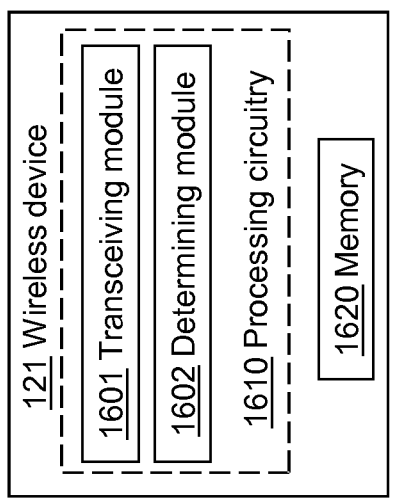
FIG. 18 is a schematic block diagram depicting embodiments of an MME.

To perform the method actions for enabling relaying of a data session of a first wireless device 121 via a second radio access node 122, 110, 123 in a radio communications network 100, wherein said data session is ongoing towards a first gateway node 151 via a first radio access node 110, 122 in the radio communications network 100 and wherein said MME 141 serves the first radio access node 110, 122, the MME 141 may comprise the following arrangement depicted in FIG. 18. FIG. 18 shows a schematic block diagram of embodiments of the MME 141. In some embodiments, the MME 141 may comprise a transceiving module 1801, and a obtaining module 1802. In some embodiments, the network node 110 may comprise a processing circuitry 1810, which may also be referred to as processing module, processing unit or processor. The processing circuitry 1810 may comprise one or more of the transceiving module 1801 and the obtaining module 1802, and/or perform the function thereof described below.

The MME 141 is configured to, e.g. by means of the transceiving module 1801, receive a first tunnel request message, from a proximity service, ProSe, function node 131 configured to operatively manage relaying of data sessions in the radio communications network 100, comprising relay information indicating that the ongoing data session is to be relayed via the second radio access node 122, 110,123. Also, the MME 141 is configured to, e.g. by means of the obtaining module 1802, obtain gateway information indicating a second gateway node 152, 153 serving the second radio access node 122, 110, 123 using the received relay information. Further, the MME 141 is configured to, e.g. by means of the transceiving module 1801, transmit a second tunnel request message to the first gateway node 151 indicating that it is to tunnel data packets of the ongoing data session via the second gateway node 152, 153.

Figure 19:
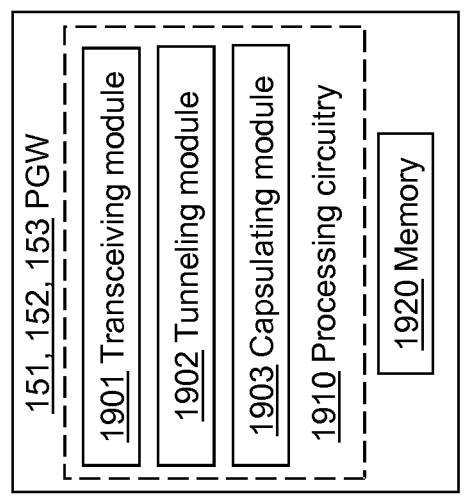
FIG. 19 is a schematic block diagram depicting embodiments of a gateway node.

To perform the method actions for enabling relaying of a data session of a first wireless device 121 via a second radio access node 122, 110, 123 in a radio communications network 100, wherein said data session is ongoing towards the first gateway node 151 via a first radio access node 110, 122 in the radio communications network 100, the first gateway node 151 may comprise the following arrangement depicted in FIG. 19. FIG. 19 shows a schematic block diagram of embodiments of the first gateway node 151. In some embodiments, the first gateway node 151 may comprise a transceiving module 1901, and a setup module 1902. In some embodiments, the first gateway node 151 may comprise a processing circuitry 1910, which may also be referred to as processing module, processing unit or processor. The processing circuitry 1910 may comprise one or more of the transceiving module 1901 and the determining module 1102, and/or perform the function thereof described below.

The first gateway node 151 is configured to, e.g. by means of the transceiving module 1901, receive a second tunnel request message, from a MME 141, indicating that it is to tunnel data packets of the ongoing data session via a second gateway node 152, 153. Also, the first gateway node 151 is configured to, e.g. by means of the setup module 1902, set up a tunnel 180, 181 via the second gateway node 152, 153 for the ongoing data session. Further, the first gateway node 151 is configured to, e.g. by means of the transceiving module 1901, transceive data packets of the ongoing data session with the second radio access node 122, 110, 123 using the tunnel 180, 181.

In some embodiments, the first gateway node 151/transceiving module 1101 may be configured to, transceive the data packets of the ongoing data session by transmit downlink data packets of the ongoing data session to the first wireless device 121 by encapsulating the downlink data packets towards the first wireless device 121 in downlink tunnel data packets addressed to the second radio access node 122, 110, 123. In some embodiments, the first gateway node 151/the transceiving module 1101 may be configured to, transceive the data packets of the ongoing data session by receive uplink data packets of the ongoing data session from the first wireless device 121 by decapsulating uplink tunnel data packets addressed to the first gateway node 151.

Figure 20:
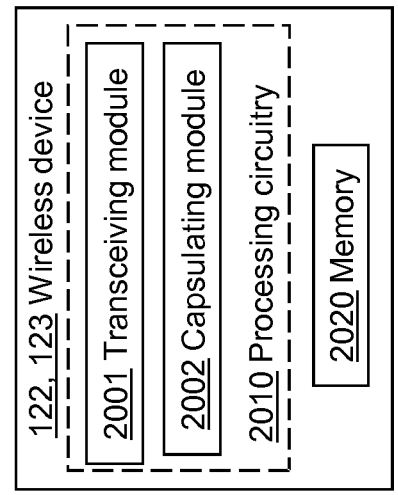
FIG. 20 is a schematic block diagram depicting embodiments of a second wireless device.

To perform the method actions for relaying a data session between a first wireless device 121 and a first gateway node 151 in a radio communications network 100, said second wireless device 122, 123 being capable of operating as a relay node for the first wireless device 121 in the radio communications network 100 by using Device-to-Device, D2D, communication with the first wireless device 121, the second wireless device 122, 123 may comprise the following arrangement depicted in FIG. 20. FIG. 20 shows a schematic block diagram of embodiments of the second wireless device 122, 123. In some embodiments, the second wireless device 122, 123 may comprise a transceiving module 2001, and a capsulating module 2002. In some embodiments, the second wireless device 122, 123 may comprise a processing circuitry 2010, which may also be referred to as processing module, processing unit or processor. The processing circuitry 2010 may comprise one or more of the transceiving module 2001 and the capsulating module 2002, and/or perform the function thereof described below.

The second wireless device 122, 123 is configured to, e.g. by means of the transceiving module 2001, receive encapsulated downlink tunnel data packets from the first gateway node 151 via a second gateway node 152, 153 serving the second wireless device 122, 123. Also, the second wireless device 122, 123 is configured to, e.g. by means of the capsulating module 2002, decapsulate the received encapsulated downlink tunnel data packets to obtain downlink data packets of the ongoing data session to the first wireless device 121. Further, the second wireless device 122, 123 is configured to, e.g. by means of the transceiving module 2001, transmit the downlink data packets of the ongoing data session to the first wireless device 121, preferably using D2D communication.

The embodiments for relaying, or enabling relaying, of a data session of a first wireless device 121 via a second radio access node 122, 110, 123 described above may be implemented through one or more processors, such as, e.g. the processing circuitry 1710 in the ProSe function node 131 depicted in FIG. 17, the processing circuitry 1810 in the MME 141 depicted in FIG. 18, the processing circuitry 1910 in the first gateway node 151 depicted in FIG. 19, and the processing circuitry 2010 in the second wireless device 122 depicted in FIG. 20, together with computer program code for performing the functions and actions of the embodiments herein. The program codes mentioned above may also be provided as computer program products, for instance in the form of data carriers carrying computer program code or code means for performing the embodiments herein when being loaded into the respective processing circuitry in the respective nodes. The computer program codes may e.g. be provided as pure program code in the respective node or on a server and downloaded to the respective nodes. The carriers may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Each of the respective nodes 131, 141, 151, 122 may further comprise a memory 1720, 1820, 1920, 2020, respectively, which may be referred to or comprise one or more memory modules or units. The memory 1720, 1820, 1920, 2020 may be arranged to be used to store executable instructions and data to perform the methods described herein when being executed in the respective node. Those skilled in the art will also appreciate that the processing circuitries 1710, 1810, 1910, 2010 and their respective memory 1720, 1820, 1920, 2020 described above may refer to a combination of analog and digital circuits, and/or one or more processors configured with software and/or firmware, e.g. stored in the memories 1720, 1820, 1920, 2020, that when executed by the one or more processors such as the corresponding processing circuitry 1710, 1810, 1910, 2010 perform the method as described in the embodiments above. One or more of these processors, as well as the other digital hardware, may be included in a single application-specific integrated circuit ASIC, or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry or module 1710, 1810, 1910, 2010, cause the at least one processor to carry out the method for relaying, or enabling relaying, of a data session of a first wireless device 121 via a second radio access node 122, 110, 123. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described first and second wireless devices, ProSe function node, the MME, and the first and second gateway nodes or methods therein, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a first wireless device for relaying a data session via a second radio access node in a radio communications network, the method comprising:
    establishing a data session towards a first gateway node via a first radio access node in the radio communications network;
    discovering radio connectivity towards the second radio access node;
    determining that the ongoing data session is to be relayed via the second radio access node; and
    transmitting a relay request message to a proximity service function, ProSe, node configured to operatively manage relaying of data sessions in the radio communications network, comprising relay information causing the ongoing data session to be relayed from the first wireless device to the first gateway node via the second radio access node while maintaining session continuity towards the first gateway node, wherein the data packets of the ongoing data session are at least partly tunneled between the first gateway node and the second radio access node.

2. The method according to claim 1, wherein the relay information further indicates the identity of the first wireless device.

3. The method according to claim 1, wherein the relay information further indicates the identity of the second radio access node.

4. The method according to claim 1, wherein the first radio access node or the second radio access node is a network node serving a cell of the radio communication network.

5. The method according to claim 1, wherein the first radio access node and/or the second radio access node is a second or third wireless device, wherein said second and third wireless device is capable of operating as a relay node of data transmissions between the first wireless device and the radio communications network.

6. The method according to claim 1, further comprising receiving downlink data packets of the ongoing data session towards the first gateway node via the first gateway node and the second radio access node.

7. The method according to claim 1, further comprising transmitting uplink data packets of the ongoing data session towards the first gateway node via the second radio access node by encapsulating the uplink data packets of the ongoing data session towards the first gateway node in uplink tunnel data packets addressed to the first gateway node.

8. A first wireless device for relaying a data session via a second radio access node in a radio communications network, the first wireless device being configured to:
    establish a data session towards a first gateway node via a first radio access node in the radio communications network;
    discover radio connectivity towards the second radio access node,
    determine that the ongoing data session is to be relayed via the second radio access node, and
    transmit a relay request message to a proximity service function, ProSe, node configured to operatively manage relaying of data sessions in the radio communications network, comprising relay information causing the ongoing data session to be relayed from the first wireless device to the first gateway node via the second radio access node while maintaining session continuity towards the first gateway node, wherein the data packets of the ongoing data session are at least partly tunneled between the first gateway node and the second radio access node.

9. The first wireless device according to claim 8, wherein the relay information further indicates the identity of the first wireless device.

10. The first wireless device according to claim 8, wherein the relay information further indicates the identity of the second radio access node.

11. The first wireless device according to claim 8, wherein the first radio access node or the second radio access node is a network node serving a cell of the radio communication network.

12. The first wireless device according to claim 8, wherein the first radio access node and/or the second radio access node is a second wireless device, wherein said second wireless device is capable of operating as a relay node of data transmissions between the first wireless device and the radio communications network.

13. The first wireless device according to claim 8, further configured to receive downlink data packets of the ongoing data session towards the first gateway node via the first gateway node and the second radio access node.

14. The first wireless device according to claim 8, further configured to transmit uplink data packets of the ongoing data session towards the first gateway node via the second radio access node by encapsulating the uplink data packets of the ongoing data session towards the first gateway node in uplink tunnel data packets addressed to the first gateway node.

* * * * *